R. S. MOORE.
PISTON FOR EXPANSION ENGINES.
APPLICATION FILED SEPT. 7, 1911.
1,020,836.
Patented Mar. 19, 1912.
Fig.1.
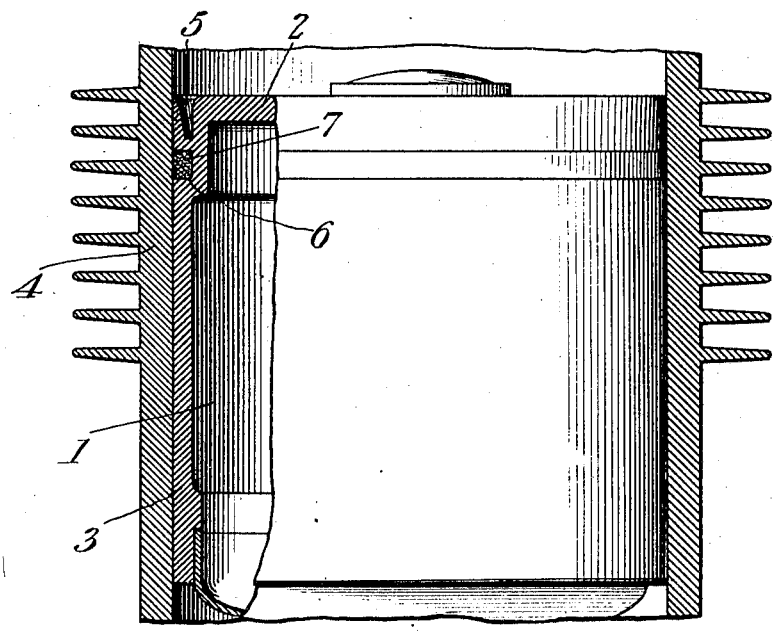
Fig.3.
Fig.2.
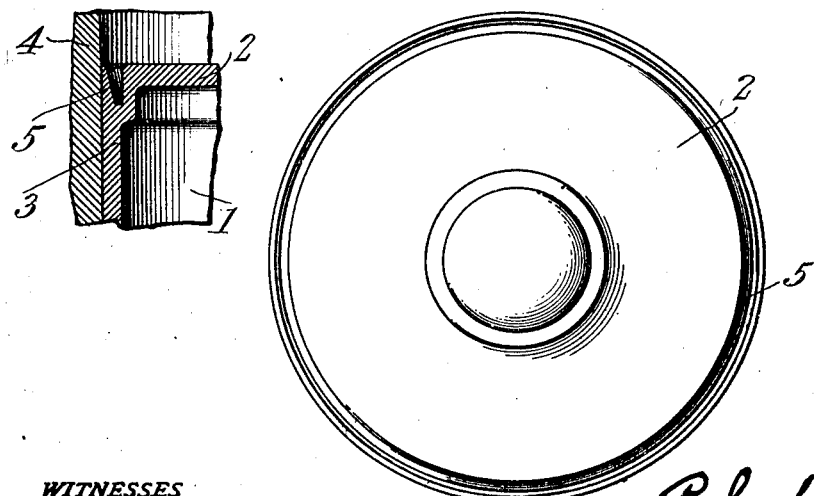
WITNESSES
Fenton S Belt
Mary H. Larr.
INVENTOR
Robert S. Moore
By Sturtevant & Mason
Attorneys

UNITED STATES PATENT OFFICE.

ROBERT S. MOORE, OF WASHINGTON, DISTRICT OF COLUMBIA, ASSIGNOR TO GYRO MOTOR COMPANY, OF WASHINGTON, DISTRICT OF COLUMBIA, A CORPORATION OF THE DISTRICT OF COLUMBIA.

PISTON FOR EXPANSION-ENGINES.

1,020,836.　　　　　Specification of Letters Patent.　　Patented Mar. 19, 1912.

Application filed September 7, 1911. Serial No. 648,222.

*To all whom it may concern:*

Be it known that I, ROBERT S. MOORE, a citizen of the United States, residing at Washington, in the District of Columbia, have invented certain new and useful Improvements in Pistons for Expansion-Engines, of which the following is a description, reference being had to the accompanying drawing and to the letters and figures of reference marked thereon.

The invention relates to new and useful improvements in pistons in general, and more especially to pistons for use in connection with expansion engines, such as gas engines.

An object of the invention is to provide a piston which may have a smooth sliding fit with the cylinder and which is not liable to bind or cause undue wear or scoring of the parts, by reason of the expansion of the metal in the head thereof, due to the heat of the expanding gases.

In the drawings which show by way of illustration one embodiment of the invention; Figure 1 is a sectional view through a part of a cylinder, and a partial sectional view through a piston having my improvements applied thereto, the remainder of the piston being in side elevation; Fig. 2 is a plan view of the head of the piston; Fig. 3 is a detail showing in section a slightly modified form of the piston.

The piston 1 as herein shown, consists of a head 2 and a cylindrical wall 3, which is formed integrally with the head 2, and constructed so as to have a smooth sliding fit with the inner wall of the cylinder 4, at points adjacent the head thereof.

It has been found in practice that the expansion of the metal in the head of the piston often causes the contact wall of the piston to bind or produce undue wear or scoring on the walls of the cylinder or the piston. Various schemes have been resorted to to avoid this binding or scoring due to the expansion of the metal. In order to overcome these objections, I have provided the head of the piston with an annular groove 5 which is located near the edge or margin of the head of the piston, and extends entirely about the same. This annular groove, as clearly shown in Fig. 1, is of such depth as to extend beyond the inner wall of the head 2 of the piston, and said annular groove is also located substantially over the cylindrical wall 3 of the piston. This annular groove forms a circumferential flange integral with the piston, and possessing sufficient elasticity to conform to the walls of the cylinder even in case of distortion, due to the effect of heat. This annular groove construction also permits expansion of the metal in the piston head 2, without causing any binding or undue wear between this annular flange and the wall of the cylinder. Furthermore, the expansion of the head due to the heat of the gases and the force of the gases, combine to hold said flange snugly against the wall of the cylinder, so that there is no leak around the piston, and the packing ring may be dispensed with entirely, if desired. Again, it will be noted that said flange projects in the same general direction as the cylindrical wall 3 and may be brought out substantially flush with the inner face of the head 2.

In Fig. 1 of the drawing, I have shown the piston also provided with an annular groove 6, which is formed in the outer surface of the cylindrical wall 3, and at a point adjacent the bottom of the groove 5. This annular groove 6, together with the annular groove 5, forms a contact ring or flange adjacent the head of the piston, which contact ring or flange may have a smooth sliding fit with the inner wall of the cylinder, and this ring or flange although integral with the piston, will not be unduly pressed against the walls of the cylinder by the expansion of the metal in the head of the piston. The annular groove 6 may have a packing ring 7 of any suitable material placed therein, if desired, although it is obvious as above noted, that from certain aspects of the invention, said packing ring may be omitted and also that said annular groove 6 may be omitted as shown in Fig. 3.

It is obvious that minor changes in the details of construction and the proportion of parts may be made, without departing from the spirit of my invention as set forth in the appended claims.

Having thus particularly described my invention, what I claim as new and desire to secure by Letters Patent, is:—

1. A piston having a head and a circumferential wall, the outer face of which at the edge adjacent the head is in contact with the wall of the cylinder, said piston having an annular groove formed in the head thereof in line with said wall, and extending to a depth therein slightly greater than the thickness of the head.

2. A piston having a head and a circumferential wall the outer face of which at the edge adjacent the head is in contact with the wall of the cylinder, said piston having an annular groove formed in the head thereof in line with said wall, and extending to a depth therein slightly greater than the thickness of the head, said wall having an annular groove therein adjacent the bottom of the annular groove in the head.

3. A piston having a head and a circumferential wall the outer face of which at the edge adjacent the head is in contact with the wall of the cylinder, said piston having an annular groove formed in the head thereof in line with said wall, and extending to a depth therein slightly greater than the thickness of the head, said wall having an annular groove therein adjacent the bottom of the annular groove in the piston head, and a packing ring seated in said annular groove in said wall.

In testimony whereof I affix my signature, in presence of two witnesses.

ROBERT S. MOORE.

Witnesses:
E. G. MASON,
H. P. HOWARD, Jr.